Oct. 23, 1951 B. N. FISHER 2,572,712

DUAL PURPOSE PICKUP ASSEMBLY AND RELIEF MEMBER THEREFOR

Filed Nov. 6, 1948

INVENTOR.
BERNE N. FISHER
BY James and Franklin
ATTORNEYS.

Patented Oct. 23, 1951 2,572,712

UNITED STATES PATENT OFFICE 2,572,712

DUAL PURPOSE PICKUP ASSEMBLY AND RELIEF MEMBER THEREFOR

Berne N. Fisher, Roselle, N. J., assignor to General Instrument Corporation, Elizabeth, N. J., a corporation of New Jersey Application November 6, 1948, Serial No. 58,645

13 Claims. (Cl. 274—24)

The present invention relates to a pick up assembly suitable for use with different type records, said assembly comprising, in a single tone arm, a plurality of pick-up units and a relief member adapted to engage the top of a record so as to decrease the force exerted on the record by the stylus or needle associated with one of the pick-up units.

This invention has particular applicability to the production of a pick-up assembly suitable for use with conventional records and also suitable for use with the new long playing records. Records of the conventional type, whether their diameter be of 10 or 12 inch, are normally rotated at approximately 78 R. P. M. The grooves in such records are normally of a width such that the diameter of the tip of the needle used to reproduce such records is approximately 3 mils. Long playing records are rotated at approximately 33 R. P. M. and the grooves of such records are much more closely spaced, in order to provide for an exceedingly long playing time for a given size record. As a result, needles capable of reproducing such long playing records must have a tip diameter of no more than approximately 1 mil. Consequently, needles suitable for use with conventional records cannot be used with long playing records. While it would be possible, if reproduction of long playing records is desired after reproduction of conventional records has been achieved, to replace the conventional needle with a needle suitable for use with the long playing records, this is normally a delicate operation and at best would be very time consuming and bothersome. Moreover, with "permanent" needles of extremely long life, removal of those needles from pick-up units is most undesirable once they have been clamped in position therein, since if they are removed and replaced, they will probably not be replaced in an alignment exactly corresponding with their previous alignment and as a result the sides of the record grooves will be severely abraded, thus cutting down record life.

Therefore, from a practical commercial point of view, it is necessary, in a record reproducing unit which is capable of reproducing both conventional and long playing records, to provide a pair of pick-up units or cartridges each more or less permanently associated with its own needle and each suitable for playing a particular type of record. While it is conceivable that an apparatus might be made with two separate tone arms, one for each type of record, such a solution of the problem is quite impractical since it involves a considerable increase in weight, in material employed, and in difficulty of operation, since each tone arm would have to have its own mounting. Not only would this prove exceedingly expensive, but it would also render impractical the employment of automatic record changers useable with both types of records, since two tone arm moving mechanisms would have to be provided, each one operative only when its associated tone arm is being employed for reproduction.

The best solution from all points of view is to employ a single tone arm and to embody therein a pair of pick-up units, one useable with each type of record, the pick-up units being movable one at a time into operative or reproducing position. However, here another problem must be considered. Optimum reproduction of standard records is achieved when the force exerted by the needle on the record is on the order to ¾ to 1½ ounces. Since the tone arm and the pick-up unit weigh more than this, it is customary to counterbalance the tone arm so that the force exerted by the needle is of the proper value. On the other hand, optimum reproduction of long playing records is achieved when the force exerted by the needle is considerably less, on the order of ¼ to ½ ounce. Exertion of greater force will result in excessive wear on the record, thus reducing its life, and in distorted reproduction.

A correlative problem resides in the fact that if the narrower long playing record needle be employed with conventional records, the narrowness of the needle will cause a wearing away of the record surface and a very rapid deterioration of the reproduceability thereof.

Consequently, when a single tone arm is employed to be used with both types of records, some mechanism must be provided for varying the force exerted on the record by the needle depending upon the type of needle and the type of record. It is possible to have a variable counterbalancing arrangement controlled by the position of the pick-up units so as to provide more counterbalancing when the pick-up unit for long playing records is in operative position. However, this would be a rather expensive matter involving relatively complicated mechanical arrangements.

Because of the very slight force exerted by the needle on the long playing record, and because of the fineness of the groves in a long playing record, reproduction of long playing records is a relatively critical matter insofar as vibration and shock are concerned, since the pick-up unit has a marked tendency to slide or "skate" over the top of the record when subjected to any external force. Damage to the record can result therefrom, but more importantly, reproduction of a part of the record will be skipped. In addition, because of the slight tracking force exerted on the needle by the fine grooves of long playing records, tone arms associated therewith quite often will not move into the terminal grooves thereof and hence conventional types of automatic record changer tripping mechanism either of the velocity or position type are not useable with any degree of certainty.

It is the prime object of the present invention to devise a pick-up assembly in a single tone arm which is capable of use both with conventional and long playing records, which automatically achieves the correct needle-record force, and which is fool-proof in operation.

Yet another prime object of the present invention is to devise an adjustable relief member associatable with a tone arm, said member engaging the top surface of a record and thus controlling the force exerted by the needle on the record, the resilience of the relief member being adjustable so as to render the needle-record force adjustable.

Yet another object of the present invention is to devise a pick-up assembly comprising a pair of pick-up units with associated needles, one suitable for reproduction of a conventional record and the other suitable for reproduction of a long playing record, the latter having associated therewith a resilient relief member engageable with the upper surface of a record when the latter unit is in operative position so as to reduce the force exerted by the needle on the record to its proper value, the tone arm being counterbalanced or otherwise constructed so that when said resilient relief member is not in record engaging position, the force exerted by a needle on a record will be suitable for conventional records.

Yet another object of the present invention is to devise a resilient relief member which not only controls the needle-record force but which also assists in the tracking of the pick-up assembly on the record.

To the accomplishment of the foregoing objects and such other objects as may hereinafter appear, the present invention relates to a dual purpose pick-up assembly and to a resilient relief member adapted to be used in conjunction therewith as defined in the appended claims and as described in this specification, taken together with the accompanying drawings, in which:

Figure 1:
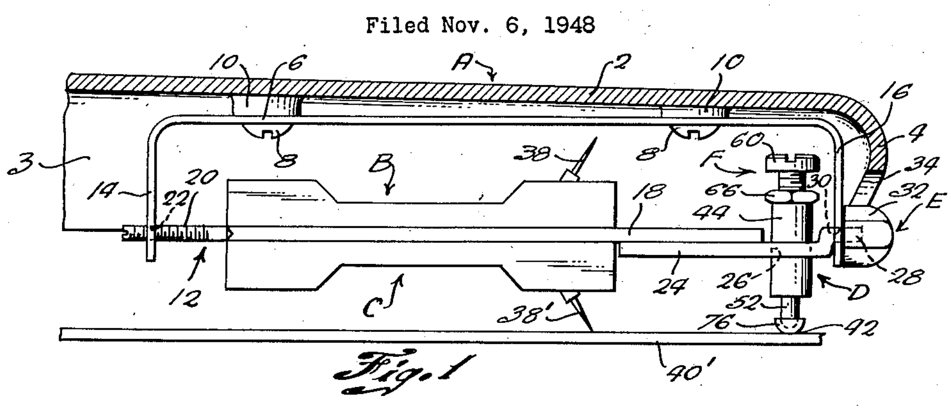
Fig. 1 is a side view, partially in cross-section, of the pick-up assembly of the present invention.

The pick-up assembly of the present invention comprises a tone arm generally designated A in which a pair of pick-up units B and C are movably mounted. These pick-up units B and C may take any conventional form, may be either of the magnetic, capacitive, crystal, or any other type, and are here shown merely schematically. A resilient relief member D is also provided and so positioned as to be operatively associated with that one of the pick-up units, designated in the drawings by the letter C, which is to be used for reproduction of long playing records. A moving mechanism generally designated E is provided for moving the pick-up units B and C and the relief member D between two placements in one of which the pick-up unit B is out of operative position, the pick-up unit C is in operative position and the relief member D is in record engaging position (see Figs. 1, 3, 4 and 5) and in the other of which the pick-up unit B is in operative position, the pick-up unit C is out of operative position and the relief member D is out of record engagement position (see Fig. 2).

As an optional but very desirable feature, a means F is provided for adjusting the resilience of the relief member D and thus controlling the force exerted on a record by the needle associated with the special pick-up unit C.

As here specifically disclosed, the tone arm A is of conventional form, comprising a U-shaped metal shell 2 having side walls 3 and an end wall 4. The tone arm A may be mounted on the reproducing apparatus in any conventional manner. A U-shaped bracket 6 is secured in the tone arm A as by means of the screws 8 receivable in bosses 10, a support generally designated 12 for the pick-up units B and C being pivotally mounted between the depending arms 14 and 16 of the bracket 6.

The support 12 may comprise a flat sheet 18 having a portion 20 of circular cross-section projecting therefrom, the pick-up unit B being secured to the sheet 18 on one side thereof and the pick up unit C being secured thereto on another and preferably opposite side thereof. The portion 20 of circular cross-section is receivable within aperture 22 in the depending arm 14 of the bracket 6. Secured to the other end of the sheet 18 is a second sheet 24 having an aperture 26 therein in which the relief member D is mounted, the sheet 24 then having an offset portion 28 of circular cross-section passable through aperture 30 in the depending arm 16 of the bracket 6 and having its tip secured within fingerpiece 32. In this way, the support 12 is pivotally mounted in the tone arm A and may be pivoted thereon through manipulation of the fingerpiece 32, the latter constituting the moving mechanism E. The front wall 4 of the tone arm A is cut away at 34 so as to permit movement of the fingerpiece 32. The depending arm 16 of the bracket 6 is provided with a pair of detents 36, 36′ (see Fig. 4) engageable with the fingerpiece 32 so as to releasably hold it in either of two positions displaced 180° with respect to one another. In one of those positions, illustrated in Fig. 2, the pick-up unit B, suitable for use with conventional records, is in operative or reproducing position, its needle 38 being vertically disposed so as to engage the conventional record 40. In this position, the pick-up unit C, suitable for use with special or long playing records, is not in operative position, and the relief member D does not engage the record 40.

Figure 2:
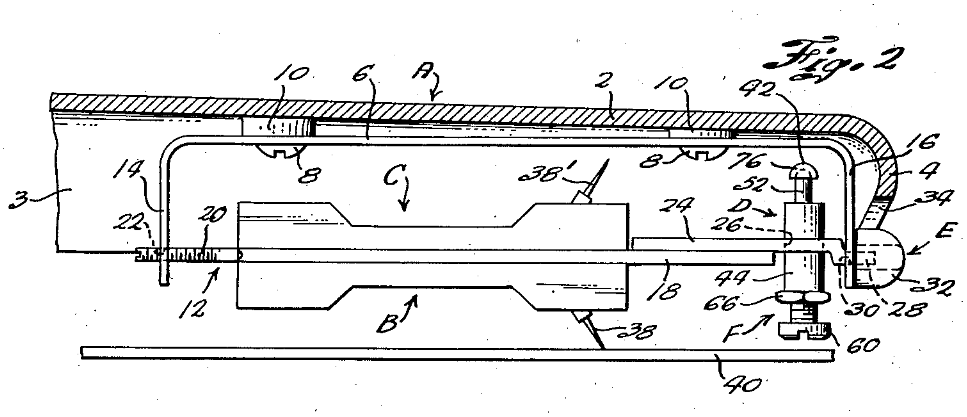
Fig. 2 is a view similar to Fig. 1 but showing the parts thereof in another position.
Figure 3:
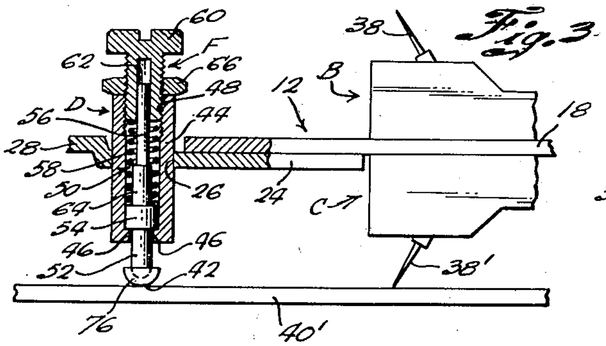
Fig. 3 is a schematic view, partially in cross-section, showing the construction of the resilient relief member.
Figure 4:
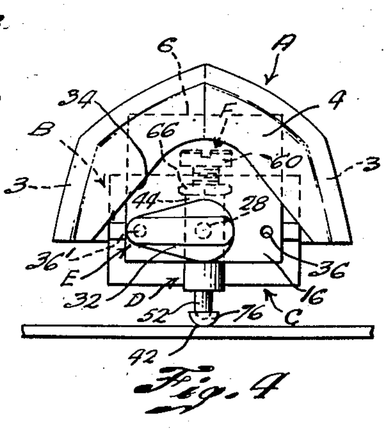
Fig. 4 is an end view of Fig. 1.

When the fingerpiece 32 is moved to its opposite position, illustrated in Figs. 1, 3 and 4, the support 12 is rotated 180° so that the conventional pick-up unit B is placed in inoperative position and the pick-up unit C is placed in operative position, its needle 38′ engaging the long playing record 40′. At the same time, the relief member D is moved to its record engaging position so that it makes contact with the upper surface of the record 40' and thus relieves the record of some of the weight of the pick-up assembly, so that the force exerted on the record 40' by the needle 38' is less than the force exerted on the record 40 by the needle 38.

In order to accomplish this, the resilient relief member D may take any one of a wide variety of forms so long as it is capable of engaging the top surface of a record when the pick-up unit C is in operative position and so long as it does not engage the top surface of a record when the pick-up unit B is in operative position. It is also essential that, when the member D does engage the top surface of a record, it resiliently acts thereon in such a way as to relieve the needle 38' of the pick-up unit C of some of the weight of the pick-up assembly. To this end, the tip 42 of the member D must normally project beyond the tip of the needle 38' any suitable amount depending upon the resilience of the member D.

In the specific construction here illustrated, the member D comprises a sleeve 44 press-fitted or otherwise secured in the aperture 26 in the plate 28, this sleeve having flanges 46 at one end thereof and a screw threaded portion 48 at the other end thereof. A plunger generally designated 50 is slidable in the sleeve 44, this plunger comprising a first portion 52 slidable between the flanges 46 and projectable out therefrom, a second portion 54 of greater diameter not passable through the flanges 46 but slidable within the sleeve 44, and a third portion 56 of reduced diameter thereabove. A spring 58 is positioned inside the sleeve 44, the bottom of the spring acting upon the top of the second plunger portion 54 so as to resiliently urge it downwardly, as viewed in Fig. 3, the top of the spring being engaged by screw 60 adjustably receivable in the internally threaded portion 48 of the sleeve 44. The farther the screw 60 is moved into the sleeve 44, the more will the spring 58 be compressed and consequently the greater will be the resilient force exerted by the member D.

It is preferred, in order to prevent binding of the plunger 50 within the sleeve 44, that the plunger 50 may remain in alignment with the sleeve 44 despite the transverse forces exerted on it by the record 40'. To this end the screw 60 is provided with an elongated open-bottomed aperture 62 into which the third plunger portion 56 is receivable. It will be apparent from Fig. 3 that this construction will ensure proper alignment of the moving parts.

It is quite convenient to employ a spring 58 of helical form, the body of the spring thus encircling the third plunger portion 56. In such a case, it is desirable to provide a fourth plunger portion 64 between the second plunger portion 54 and the third plunger portion 56 and having a diameter intermediate those of the portions 54 and 56, the space between the fourth plunger portion 64 and the interior of the sleeve 44 being just sufficient to provide for free movement of the helical spring 58 and the plunger 50. This fourth plunger portion 64 acts as a support and guide for the spring 58, thus maintaining it, too, in axial alignment with the other parts.

Figure 5:
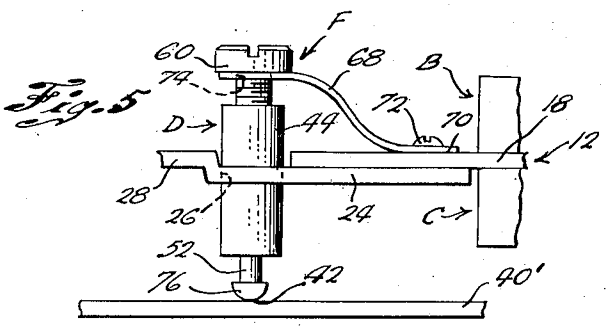
Fig. 5 is a view similar to Fig. 3 but showing an alternative construction.

Once the screw 60 has been set to a position in which the resilience of the member D is as desired, it may be locked in that position by means of the lock nut 66 shown in Fig. 3, or a spring strip 68 secured at one end 70 to the sheet 12 as by means of the screw 72 and having an aperture 74 in its other end through which the screw 60 is passable, as illustrated in Fig. 5, may serve the same purpose.

In order to assist in distributing the force over a large area and at the same time in order to improve the tracking of the tone arm A over long playing records 40' and reduce the tendency to "skate," it has been found desirable to provide the projecting end of the first plunger portion 52 with a pad 76 of felt, rubber, or other soft frictional material. By frictionally engaging a plurality of grooves of the record 40' simultaneously, this pad 76 will cause the tone arm A to travel properly over the surface of the record 40' and will also engage the terminal grooves of that record with sufficient force so as to ensure the operation of whatever automatic record changer tripping mechanism is employed.

The operation of this pick-up assembly will in the main be apparent from the foregoing description. When it is desired to reproduce conventional records, the fingerpiece 32 is rotated to its position illustrated in Fig. 2, at which time the needle 38 of the pick-up unit B will engage the conventional record 40 with the proper force, between ¾ and 1½ ounces. It will be noted that the screw 60 is positoined above the tip of the needle 38 so that the member D will make no contact with the record 40. If long playing records are to be reproduced, the fingerpiece 32 is rotated to its position illustrated in Figs. 1 and 4, at which time the pick-up unit B will be moved out of operative position and the pick-up unit C will be moved into operative position so that the needle 38' may engage the grooves of the long playing record 40'. At the same time, the member D is positioned in its record-engaging position so that when the tone arm is lowered onto the record 40', the tip 42 of the member D, since it projects below the tip of the needle 38', will make contact with the upper surface of the record 40' before the needle 38' makes contact. In order for the needle 38' to reach the record 40', it is necessary that the plunger 50 slide upwardly in the sleeve 44, resulting in compression of the spring 58. The spring 58 will therefore exert a force upon the surface of the record and the amount of that force will be substracted from the normal force of ¾ to 1½ ounces exerted by the tone arm assembly, the force between the needle 38' and the record 40' being the difference between those two values. Thus, if the needle 38 of the conventional pick-up unit B exerts a force on the record 40 of 1½ ounces, and if it be desired that the needle 38' of the special pick-up unit C exert a force of only ¼ ounce on the long playing record 40', the screw 60 will be screwed into the sleeve 44 so as to compress the spring 58 enough that, when the plunger 50 is slid upwardly in the sleeve 44 a distance equal to the amount the tip of the plunger 50 extends below the tip of the needle 38, the spring 58 will exert a pressure on the plunger 50 and hence on the record 40' of 1¼ ounces. The resilience of the member D may be adjusted when the pick-up assembly is in its position of Fig. 2, at which time the screw 60 is accessible from the underside of the tone arm A. The force exerted by the member D upon the record 40' is in no way deleterious, since the surface of the tip 42 of the member D which actually engages the record 40' is considerably broader than the one mil diameter of the tip of the needle 38'. Hence, the tip 42 of the member D spans a large number of record grooves and, the force being distributed over a large area, the pressure is very light. Moreover, the broad contacting surface provides for improved tracking and reduces the "skating" tendency inherent in pick-up units normally associated with long playing records.

The pick-up assembly of the present invention is extremely simple, is composed of a relatively small number of parts, all of them easily produceable by mass production methods, is easily assembled, is positive and adjustable in operation, and hence is particularly inexpensive and valuable from a commercial point of view. In addition, the pick-up assembly may easily be placed in tone arms of the type already in use, it being necessary merely to remove the pick-up unit already in place in such tone arms and insert the assembly of the present invention. In this way, tone arms now suitable for use only with conventional records can very easily be converted into dual purpose tone arms.

While this invention has been here specifically described with respect to conventional and long playing records, it will be apparent that it is available for use in any application where different pressures are to be exerted upon records, as, for example, in combination recording and reproducing heads. Many variations may be made in the detailed construction of the apparatus all within the spirit of the invention as defined in the following claims.

I claim:

1. A dual purpose pick-up assembly suitable for use with different types of records comprising a tone arm, a pair of pick-up units mounted in said tone arm so as to be movable one at a time into an operative position, each of said units having a needle projecting therefrom, and a resilient relief member mounted on said tone arm and operatively connected to one of said units so as to be moved therewith, said relief member comprising a non-vertically movable sleeve, a plunger slidable therein and having a tip projecting therefrom, a spring within said sleeve active on said plunger to urge it outwardly in the direction of said tip, and means for adjusting the tension of said spring on said plunger, the tip of said plunger extending beyond the needle in said one of said units and being resiliently movable inwardly, said member being movable into record engaging position only when said one of said units is in operative position so that the tip of said plunger engages the top surface of a record and reduces the force exerted on said record by the needle of said one of said units.

2. A dual purpose pick-up assembly suitable for use with two types of records each requiring a different pick-up unit, said assembly comprising a tone arm, a support articulately mounted in said tone arm, a first pick-up unit on one portion of said support and having a first needle depending therefrom, another pick-up unit on another portion of said support and having a second needle depending therefrom, and a resilient relief member secured to and projecting from said support, said relief member comprising a sleeve fixed to said support, a plunger slidable therein and having a tip projecting out therefrom on the same side thereof as said second needle, a spring within said sleeve active on said plunger to urge it outwardly in the direction of said tip, and means for adjusting the tension of said spring on said plunger, the tip of said plunger extending beyond said second needle when said special pick-up unit is in operative position but being resiliently movable inwardly, said tip engaging the top surface of a record only when said other pick-up unit is in operative position and reducing the force exerted by said second needle on said record.

3. A dual purpose pick-up assembly suitable for use with two types of records each requiring a different pick-up unit, said assembly comprising a tone arm, a bracket secured thereto, a support pivotally mounted in said bracket, a first pick-up unit on one side of said support and having a first needle depending therefrom, another pick-up unit on another side of said support and having a second needle depending therefrom, and a resilient relief member secured to and projecting from said other side of said support, the tip of said member extending beyond said second needle but being resiliently movable toward said support, said tip engaging the top surface of a record when said other pick-up unit is in operative position and reducing the force exerted by said second needle on said record.

4. A dual purpose pick-up assembly suitable for use with two types of records each requiring a different pick-up unit, said assembly comprising a tone arm, a bracket secured thereto, a support pivotally mounted in said bracket, a first pick-up unit on one side of said support and having a first needle depending therefrom, another pick-up unit on the opposite side of said support and having a second needle depending therefrom, and a resilient relief member secured to and projecting from said opposite side of said support, the tip of said member extending beyond said second needle but being resiliently movable toward said support, said tip engaging the top surface of a record when said other pick-up unit is in operative position and reducing the force exerted by said second needle on said record.

5. The dual purpose pick-up assembly of claim 2, in which said sleeve has a flange at its bottom and internal threads at its top, said plunger comprising, in order, a first portion slidable between said flanges and terminating in a tip, and a second portion of larger diameter slidable in said sleeve but not passable between said flanges, the bottom of said spring engaging the top of said second plunger portion, and in which a screw is threadable into the top of said sleeve so as to engage the top of said spring and adjust its tension.

6. The dual purpose pick-up assembly of claim 2, in which said sleeve has a flange at its bottom and internal threads at its top, said plunger comprising, in order, a first portion slidable between said flanges and terminating in a tip, a second portion of larger diameter slidable in said sleeve but not passable between said flanges, and a third portion of smaller diameter, the bottom of said spring engaging the top of said second plunger portion, and in which a screw having an open-bottomed aperture is threadable into the top of said sleeve so as to engage the top of said spring and adjust its tension, said third plunger portion being receivable inside said open-bottomed aperture as said screw is threaded into said sleeve.

7. A resilient relief member for use on a tone arm and engageable with a record comprising a sleeve secured to said tone arm, said sleeve having a flange at its bottom and internal threads at its top, a plunger slidable in said sleeve, said plunger comprising, in order, a first portion slidable between said flanges and terminating in a tip, a second portion of larger diameter slidable in said sleeve but not passable between said flanges, and a third portion of smaller diameter, a spring in said sleeve the bottom of which engages the top of said second plunger portion and the both of which encircles said third plunger portion, and a screw having an open-bottomed aperture threadable into the top of said sleeve and engaging the top of said spring to adjust its tension, said third plunger portion being receivable in said open-bottomed aperture as said screw is threaded into said sleeve.

8. A dual purpose pick-up assembly suitable for use with different types of records comprising a tone arm, a pair of pick-up units mounted in said tone arm so as to be movable one at a time into an operative position, each of said units having a needle projecting therefrom, and a resilient relief member mounted on said tone arm and operatively connected to one of said units so as to be moved therewith, said relief member comprising a non-vertically movable sleeve, a plunger slidable therein and having a tip projecting therefrom, and a spring within said sleeve active on said plunger to urge it outwardly in the direction of said tip, the tip of said plunger extending beyond the needle in said one of said units and being resiliently movable inwardly, said member being movable into record engaging position only when said one of said units is in operative position so that the tip of said plunger engages the top surface of a record and reduces the force exerted on said record by the needle of said one of said units.

9. A dual purpose pick-up assembly suitable for use with two types of records each requiring a different pick-up unit, said assembly comprising a tone arm, a support articulately mounted in said tone arm, a first pick-up unit on one portion of said support and having a first needle depending therefrom, another pick-up unit on another portion of said support and having a second needle depending therefrom, and a resilient relief member secured to and projecting from said support, said relief member comprising a sleeve fixed to said support, a plunger slidable therein and having a tip projecting out therefrom on the same side thereof as said second needle, and a spring within said sleeve active on said plunger to urge it outwardly in the direction of said tip, the tip of said plunger extending beyond said second needle when said other pick-up unit is in operative position but being resiliently movable inwardly, said tip engaging the top surface of a record only when said other pick-up unit is in operative position and reducing the force exerted by said second needle on said record.

10. A dual purpose pick-up assembly suitable for use with two types of records each requiring a different pick-up unit, said assembly comprising a tone arm having an open bottom and a substantially U-shaped cross section, thus defining an open-bottomed housing, a bracket secured to the inside of said tone arm, a support mounted in said bracket and inside said tone arm so as to be pivotable about an axis substantially parallel to the plane of said tone arm, a first pick-up unit on one side of said support and having a first needle depending therefrom, another pick-up unit on another side of said support and having a second needle depending therefrom, and a resilient relief member secured to and projecting from said other side of said support, the tip of said member extending beyond said second needle but being resiliently movable toward said support, said tip engaging the top surface of a record when said other pick-up unit is in operative position and reducing the force exerted by said second needle on said record, said first pick-up unit being housed within said tone arm when the support is positioned so that said other pick-up unit is in operative position, and vice versa.

11. A dual purpose pick-up assembly suitable for use with two types of records each requiring a different pick-up unit, said assembly comprising a tone arm having an open bottom and a substantially U-shaped cross section, thus defining an open bottomed housing, a bracket secured to the inside of said tone arm, a support mounted in said bracket and inside said tone arm so as to be pivotable about an axis substantially parallel to the plane of said tone arm, a first pick-up unit on one side of said support and having a first needle depending therefrom, another pick-up unit on the opposite side of said support and having a second needle depending therefrom, and a resilient relief member secured to and projecting from said opposite side of said support, the tip of said member extending beyond said second needle but being resiliently movable toward said support, said tip engaging the top surface of a record when said other pick-up unit is in operative position and reducing the force exerted by said second needle on said record, said first pick-up unit being housed within said tone arm when the support is positioned so that said other pick-up unit is in operative position, and vice versa.

12. A dual purpose pick-up assembly suitable for use with two types of records each requiring a different pick-up unit, said assembly comprising a tone arm having an open bottom and a substantially U-shaped cross section, thus defining an open bottomed housing, a support mounted inside said tone arm so as to be pivotable about an axis substantially parallel to the plane of said tone arm, a first pick-up unit on one side of said support and having a first needle depending therefrom, another pick-up unit on another side of said support and having a second needle depending therefrom, and a resilient relief member secured to and projecting from said other side of said support, the tip of said member extending beyond said second needle but being resiliently movable toward said support, said tip engaging the top surface of a record when said other pick-up unit is in operative position and reducing the force exerted by said second needle on said record, said first pick-up unit being housed within said tone arm when the support is positioned so that said other pick-up is in operative position, and vice versa.

13. A dual purpose pick-up assembly suitable for use with two types of records each requiring a different pick-up unit, said assembly comprising a tone arm having an open bottom and a substantially U-shaped cross section, thus defining an open bottomed housing, a support mounted inside said tone arm so as to be pivotable about an axis substantially parallel to the plane of said tone arm, a first pick-up unit on one side of said support and having a first needle depending therefrom, another pick-up unit on the opposite side of said support and having a second needle depending therefrom, and a resilient relief member secured to and projecting from said opposite side of said support, the tip of said member extending beyond said second needle but being resiliently movable toward said support, said tip engaging the top surface of a record when said other pick-up unit is in operative position and reducing the force exerted by said second needle on said record, said first pick-up unit being housed within said tone arm when the support is positioned so that said other pick-up unit is in operative position, and vice versa.

BERNE N. FISHER.

REFERENCES CITED

The following references are of record in the file of this patent:

UNITED STATES PATENTS

| Number | Name | Date |
|---|---|---|
| 605,667 | Edison | June 14, 1898 |
| 783,389 | Roussel | Feb. 21, 1905 |
| 1,049,237 | Holland | Dec. 31, 1912 |
| 1,155,572 | Holland | Oct. 5, 1915 |
| 1,283,771 | Holland | Nov. 5, 1918 |
| 1,294,672 | Kellum | Feb. 18, 1919 |
| 1,607,004 | Kramer | Nov. 16, 1926 |
| 1,874,101 | Head | Aug. 30, 1932 |
| 1,915,426 | Kohler | June 27, 1933 |
| 2,380,467 | Ressler | July 31, 1945 |